(12) United States Patent
Loaces (10) Patent No.: US 7,766,256 B2
(45) Date of Patent: Aug. 3, 2010

(54) COMBINATION BLOWER AND HERBICIDE SPRAYING DEVICE

(76) Inventor: Francisco B. Loaces, 2885 Shadowbrook Ct., Concord, NC (US) 28027

( * ) Notice: Subject to any disclaimer, the term of this patent is extended or adjusted under 35 U.S.C. 154(b) by 0 days.

(21) Appl. No.: 12/403,413

(22) Filed: Mar. 13, 2009

(65) Prior Publication Data

US 2009/0173805 A1   Jul. 9, 2009

Related U.S. Application Data

(63) Continuation of application No. 11/315,093, filed on Dec. 22, 2005, now abandoned, and a continuation-in-part of application No. 10/872,284, filed on Jun. 18, 2004, now abandoned.

(60) Provisional application No. 60/639,155, filed on Dec. 22, 2004, provisional application No. 60/479,750, filed on Jun. 19, 2003.

(51) Int. Cl.
*A62C 15/00* (2006.01)
*B05B 9/08* (2006.01)

(52) U.S. Cl. .......... 239/154; 239/340; 15/414; 56/12.7

(58) Field of Classification Search .......... 239/154, 239/340, 289, 369, 152, 722, 146; 15/414, 15/405, 322; 43/132.1; 416/119; 56/12.7
See application file for complete search history.

(56) References Cited

U.S. PATENT DOCUMENTS

| 2,201,995 | A  | * | 5/1940  | Erickson  | 43/125   |
|-----------|----|---|---------|-----------|----------|
| 5,106,020 | A  | * | 4/1992  | Harrell   | 239/172  |
| 5,947,384 | A  | * | 9/1999  | McCauley  | 239/152  |
| 6,409,097 | B1 | * | 6/2002  | McCauley  | 239/289  |
| 6,837,447 | B1 | * | 1/2005  | Clark     | 239/318  |
| 6,908,052 | B1 | * | 6/2005  | Jacobson  | 239/722  |
| 7,437,796 | B2 | * | 10/2008 | Rappin    | 15/327.5 |
| 7,559,490 | B2 | * | 7/2009  | Rappin    | 239/154  |
| 2004/0084552 | A1 | * | 5/2004 | Huartson | 239/146 |
| 2004/0255564 | A1 | * | 12/2004 | Loaces  | 56/12.7 |

* cited by examiner

*Primary Examiner*—Árpád Fábián-Kovács
(74) *Attorney, Agent, or Firm*—Ashley Law Firm P.C.; Stephen S. Ashley, Jr.

(57) ABSTRACT

An apparatus for performing grounds maintenance functions and dispensing a fluid includes a grounds maintenance device and a fluid spraying device. The spraying device includes a container mounted on the grounds maintenance device for holding the fluid, and a spraying member in communication with the container for spraying the fluid. The spraying member is moveable from a carrying position in which the spraying member is carried on the grounds maintenance device to a spraying position in which the spraying member is moveable independent of the grounds maintenance device.

14 Claims, 10 Drawing Sheets

COMBINATION BLOWER AND HERBICIDE SPRAYING DEVICE

This application is a continuation of U.S. application Ser. No. 11/315,093, filed Dec. 22, 2005, which claims the benefit of U.S. Provisional Application No. 60/639,155, filed Dec. 22, 2004. In addition, U.S. application Ser. No. 11/315,093 is a continuation-in-part of U.S. application Ser. No. 10/872,284, filed Jun. 18, 2004, now abandoned, which claimed the benefit of U.S. Provisional Application No. 60/479,750, filed Jun. 19, 2003. All of said applications are incorporated herein by reference.

TECHNICAL FIELD AND BACKGROUND OF THE INVENTION

The invention relates to an apparatus that can perform grounds maintenance functions such as leaf blowing, weed trimming or edging, and also dispense a fluid composition such as a herbicide. The invention is particularly suited for large landscaping projects that require a worker to cover long distances. The invention combines the function of a motorized grounds maintenance tool, such as a weed trimmer, edger or leaf blower, with the related function of herbicide dispensing, thereby eliminating the need for the worker to make two trips over the same area.

Motorized leaf blowers, weed trimmers and edgers, powered by gas or electricity, are commonly used in grounds maintenance projects. In addition, the use of pesticides, such as herbicides, fungicides and insecticides, are commonly used to eliminate and prevent unwanted vegetation and insects. A landscaper will often use a leaf blower, weed trimmer or edger in a certain area, and then have to return to the same area to dispense pesticide using a separate spraying apparatus. Typically, this requires the landscaper to perform the blowing, trimming or edging operations, return the grounds maintenance tool to a truck or other location where the pesticide dispensing equipment is retrieved, and then travel along the same area again with the pesticide dispensing equipment. The fact that landscaping work often requires commercial landscapers to walk significant distances exacerbates the inconvenience and inefficiency created by having to travel the same area twice.

SUMMARY OF THE INVENTION

Therefore it is an object of the present invention to provide a lawn maintenance apparatus that can function as a leaf blower and can also dispense a fluid, such as a herbicide, fungicide, pesticide or insecticide.

Another object of the present invention is to provide an apparatus having a spray wand for dispensing a stream of herbicide that enables the user to direct the stream of pesticide at a particular location.

These and other objectives of the present invention are achieved by providing an apparatus for performing grounds maintenance functions and dispensing a fluid having a grounds maintenance device and a fluid spraying device. The spraying device includes a container mounted on the grounds maintenance device for holding the fluid, and a spraying member in communication with the container for spraying the fluid. The spraying member is moveable from a carrying position in which the spraying member is carried on the grounds maintenance device to a spraying position in which the spraying member is moveable independent of the grounds maintenance device.

According to another preferred embodiment of the invention, the grounds maintenance device is a leaf blower.

According to another preferred embodiment of the invention, the grounds maintenance device is a weed trimmer.

According to yet another preferred embodiment of the invention, the grounds maintenance device is an edger.

According to yet another preferred embodiment of the invention, the spraying member is a wand, and an elongate holder is mounted on the grounds maintenance device for carrying the wand.

According to yet another preferred embodiment of the invention, a motor is provided for powering the grounds maintenance device.

According to yet another preferred embodiment of the invention, a handle is attached to the grounds maintenance device for facilitating lifting and carrying of the apparatus by the user.

According to yet another preferred embodiment of the invention, is sized to hold approximately forty fluid ounces.

According to yet another preferred embodiment of the invention, the fluid includes one or more selected from the group consisting of a herbicide, fungicide, pesticide and insecticide.

According to yet another preferred embodiment of the invention, an air pump is in communication with the container via a first fluid line, so that the container is pressurized.

According to yet another preferred embodiment of the invention, a second fluid line connects the container and the spraying member. A trigger is operatively connected to a valve positioned in the second fluid line so that pressing the trigger opens the valve to allow the fluid to pass through the second fluid line and into the spraying member.

According to yet another preferred embodiment of the invention, a strap is attached to the grounds maintenance device for aiding the user in carrying the apparatus.

According to yet another preferred embodiment of the invention, the apparatus includes a leaf blower unit having an elongate tube for dispensing a stream of air, and a spraying device for spraying a fluid. A container is mounted on the leaf blower unit for holding the fluid, and a wand is in communication with the container for spraying the fluid. The wand is moveable from a carrying position wherein the wand is carried on the leaf blower unit, and a spraying position wherein the wand is moveable independent of the leaf blower unit.

According to yet another preferred embodiment of the invention, the leaf blower unit includes a motor for being carried on a back of a user.

According to a preferred method of using the invention, the user uses the grounds maintenance device to perform a predetermined grounds maintenance function such as blowing leaves or trimming weeds, while the spraying member is maintained in the carrying position. When the user wishes to spray fluid at a desired location, the spraying member is removed from the grounds maintenance device, and a terminal end of the spraying member is directed at the desired location.

According to yet another preferred embodiment of the invention, the container of the spraying device is pressurized. The container and the spraying member are connected by a fluid line, and a trigger is operatively connected to a valve positioned in the fluid line.

According to yet another preferred embodiment of the invention, the step of spraying the fluid includes engaging the trigger.

DESCRIPTION OF THE INVENTION

Referring now specifically to the drawings, a landscaping and fluid dispensing apparatus according to a preferred embodiment of the invention is illustrated in FIGS. 1-5, and shown generally at reference numeral 10. The apparatus 10 generally comprises a spraying device attachment 12 mounted on a grounds maintenance device, such as a leaf blower 11 of the type that is carried on the back of the user "U". The spraying device 12 can spray a variety of fluids, including fluids used in landscaping operations, such as liquid herbicides, fungicides, pesticides, insecticides, water and fertilizer. The sprayer 12 is preferably used to spray a liquid herbicide such as ROUNDUP weed killer.

Figure 1:
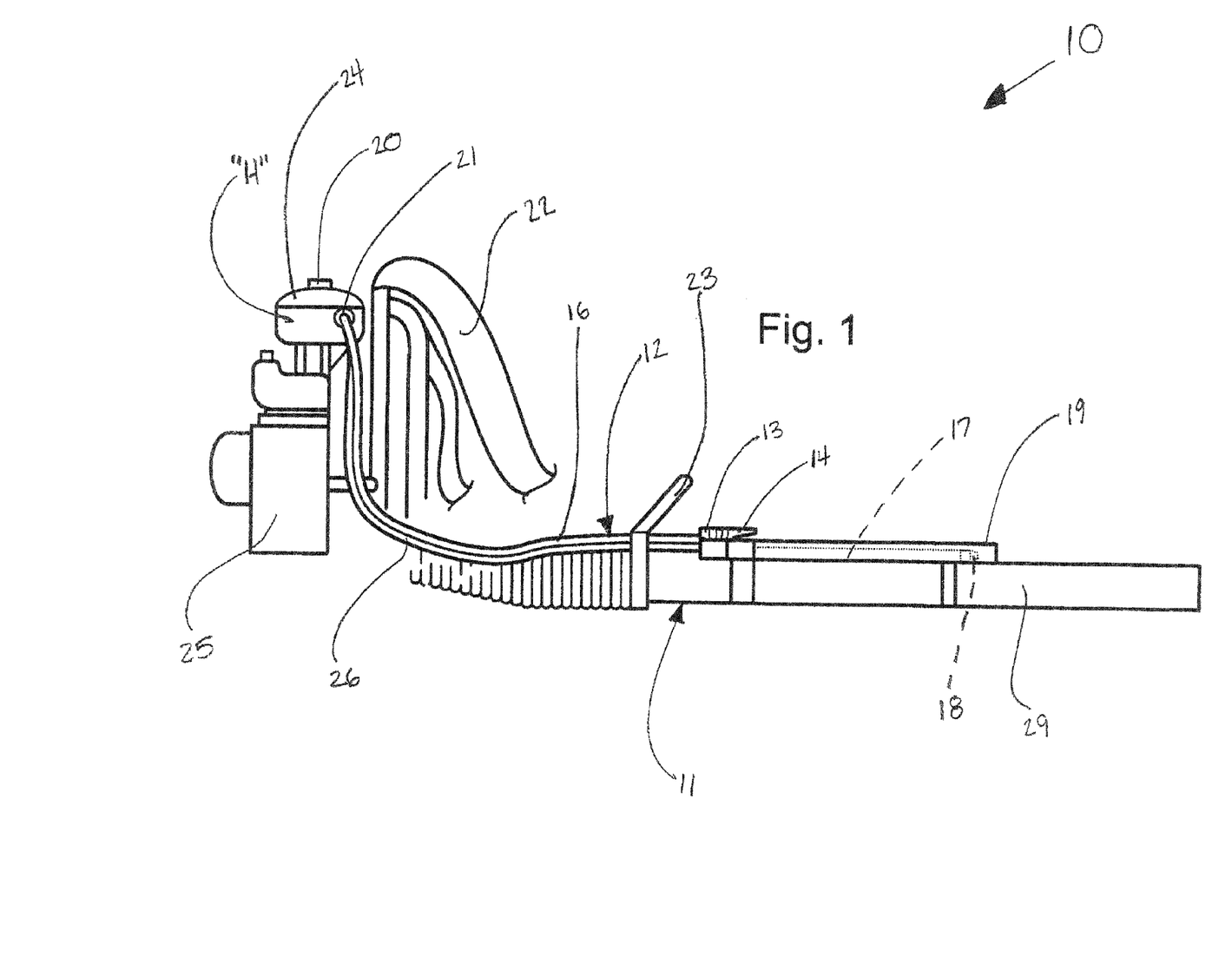
FIG. 1 is a side elevation of a Combination Blower and Herbicide Spraying Device, according to a preferred embodiment of the invention.

As shown in FIG. 1, the sprayer 12 includes a container 24 for holding the liquid herbicide "H". Preferably, the container 24 is sized to contain forty fluid ounces. A fill cap 20 is positioned at the top of the container 24, which can be removed to pour the herbicide into the container 24. The fill cap 20 is held on the container 24 by threaded engagement or other appropriate means.

The container 12 has a one way valve 21 that communicates with a pressurized fluid line 16 and an air pump 13 that pressurizes the container 12. A second fluid line 26 communicates with the container 24 and a spraying member, such as a spray wand 17. It should be noted that other devices, such as a spray gun, can be used as the spraying member. A trigger 14 is operatively connected to a release valve 15 positioned in the fluid line 16. By pressing the trigger 14, the release valve 15 opens to release the desired amount of herbicide through fluid line 26, thereby delivering a stream of herbicide to spray wand 17 and out spray tip 18.

Figure 2:
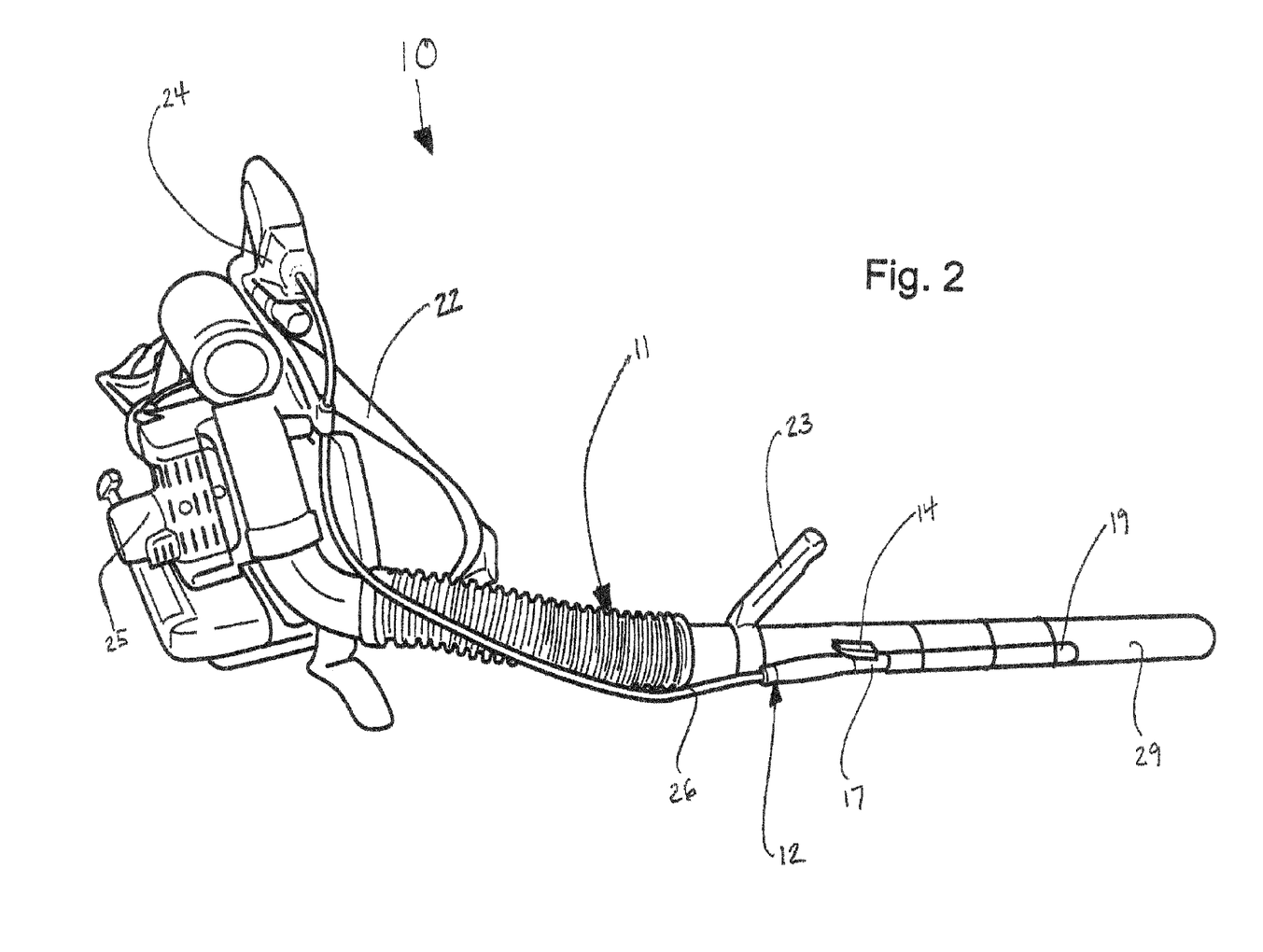
FIG. 2 is a perspective view of the Combination Blower and Herbicide Spraying Device of FIG. 1.
Figure 3:
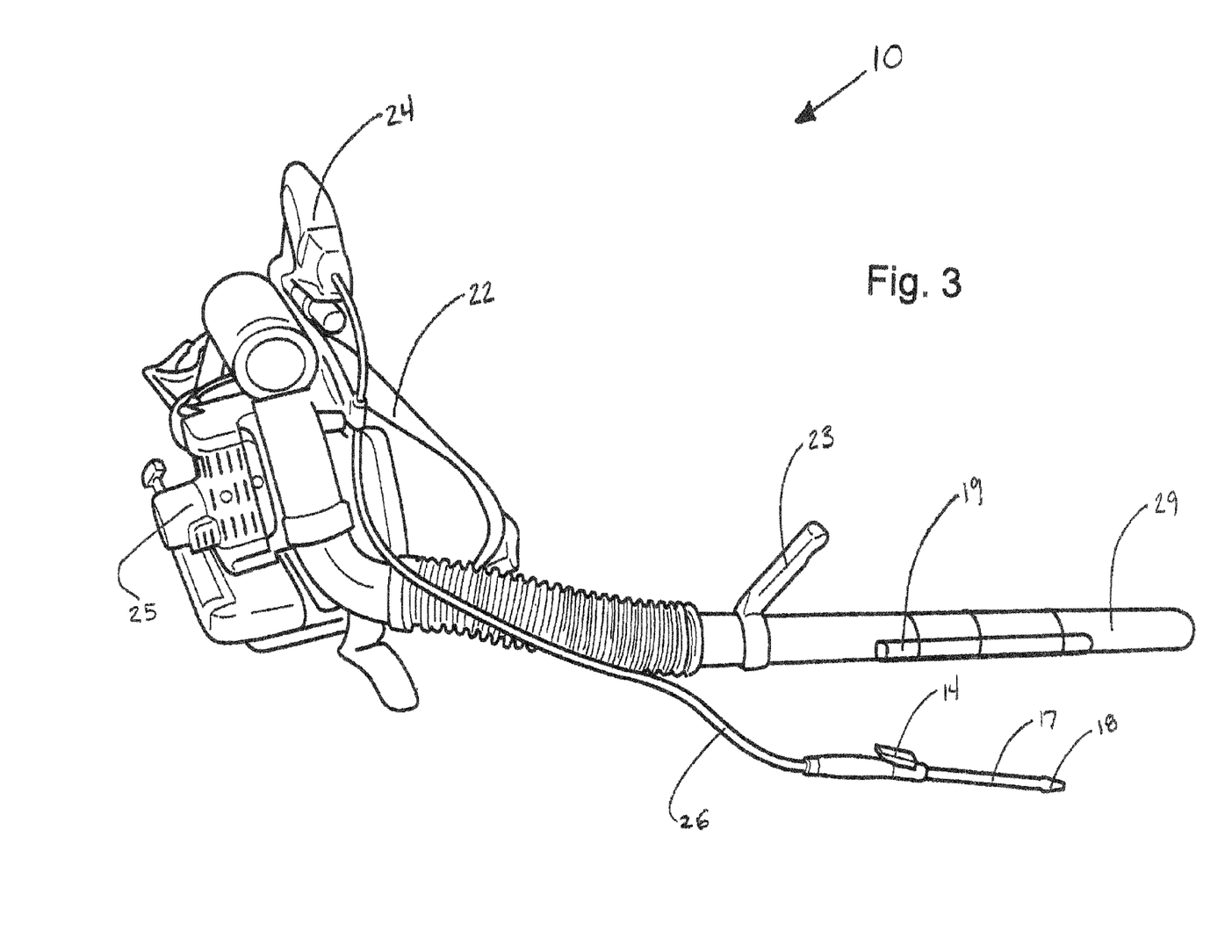
FIG. 3 is another perspective view of the Combination Blower and Herbicide Spraying Device of FIG. 1.

The spray wand 17 can be contained within a holster-like apparatus, such as wand holder 19, as shown in FIGS. 1-2. The spray wand 17 can be removed from the wand holder 19, as shown in FIG. 3, and moved independently of the leaf blower 11 in any direction.

The leaf blower 11 includes a motor unit 25 for generating and blowing a stream of air through an exit tube 29. A strap 22 is provided for the user "U" to position on his shoulder for carrying the motor unit 25 on his back, and a handle 23 is mounted on the blower 11 for carrying the apparatus 10.

The apparatus 10 enables a user "U" to selectively spray a particular weed or weeds on a sidewalk, curb, or parking lot while using the blower 11 in the same area. Such is the typical routine that a landscaping company regularly performs on each job site. The apparatus 10 enables the user to avoid re-walking over the same area that would otherwise have to be re-walked when using a prior art back-pack sprayer or handheld sprayer.

Figure 4:
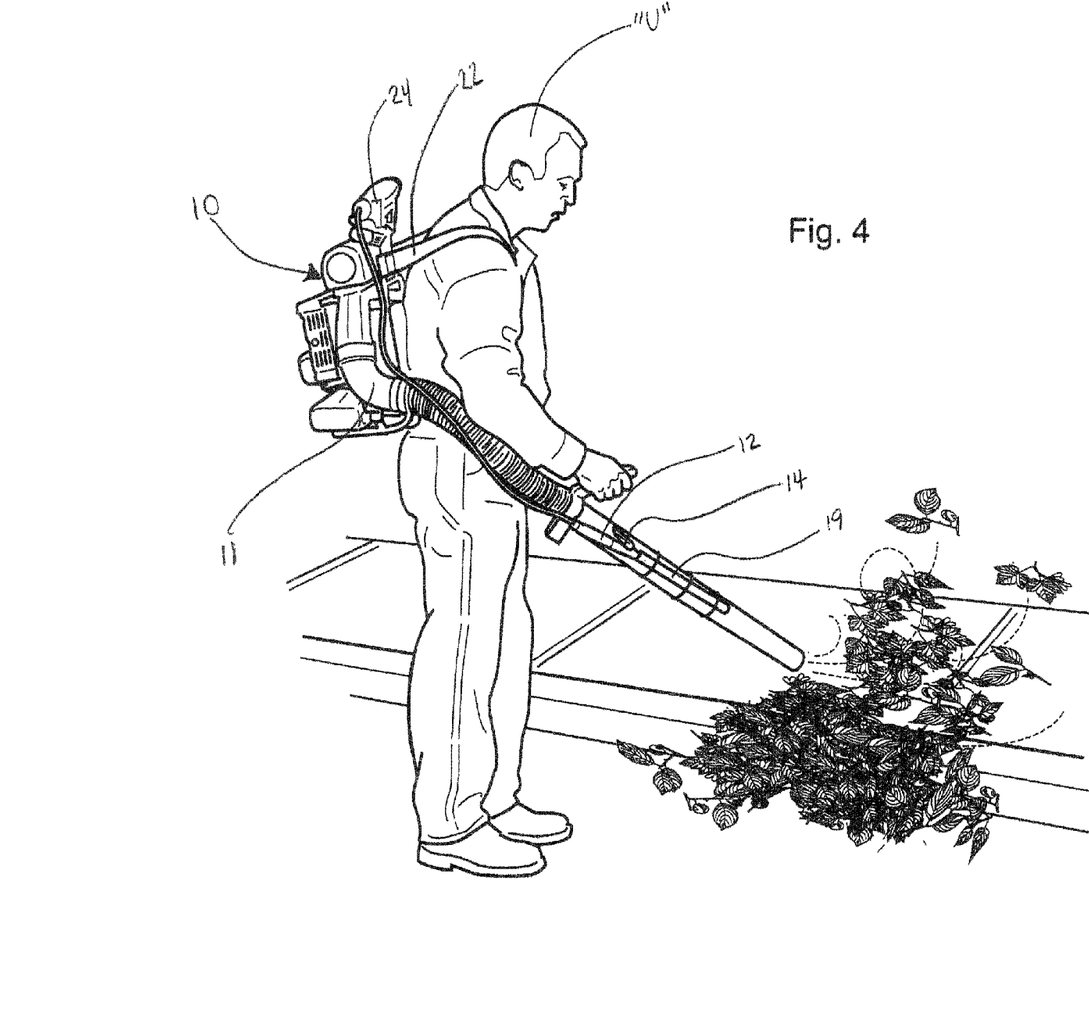
FIG. 4 is an environmental view showing the Combination Blower and Herbicide Spraying Device of FIG. 1 in use.
Figure 5:
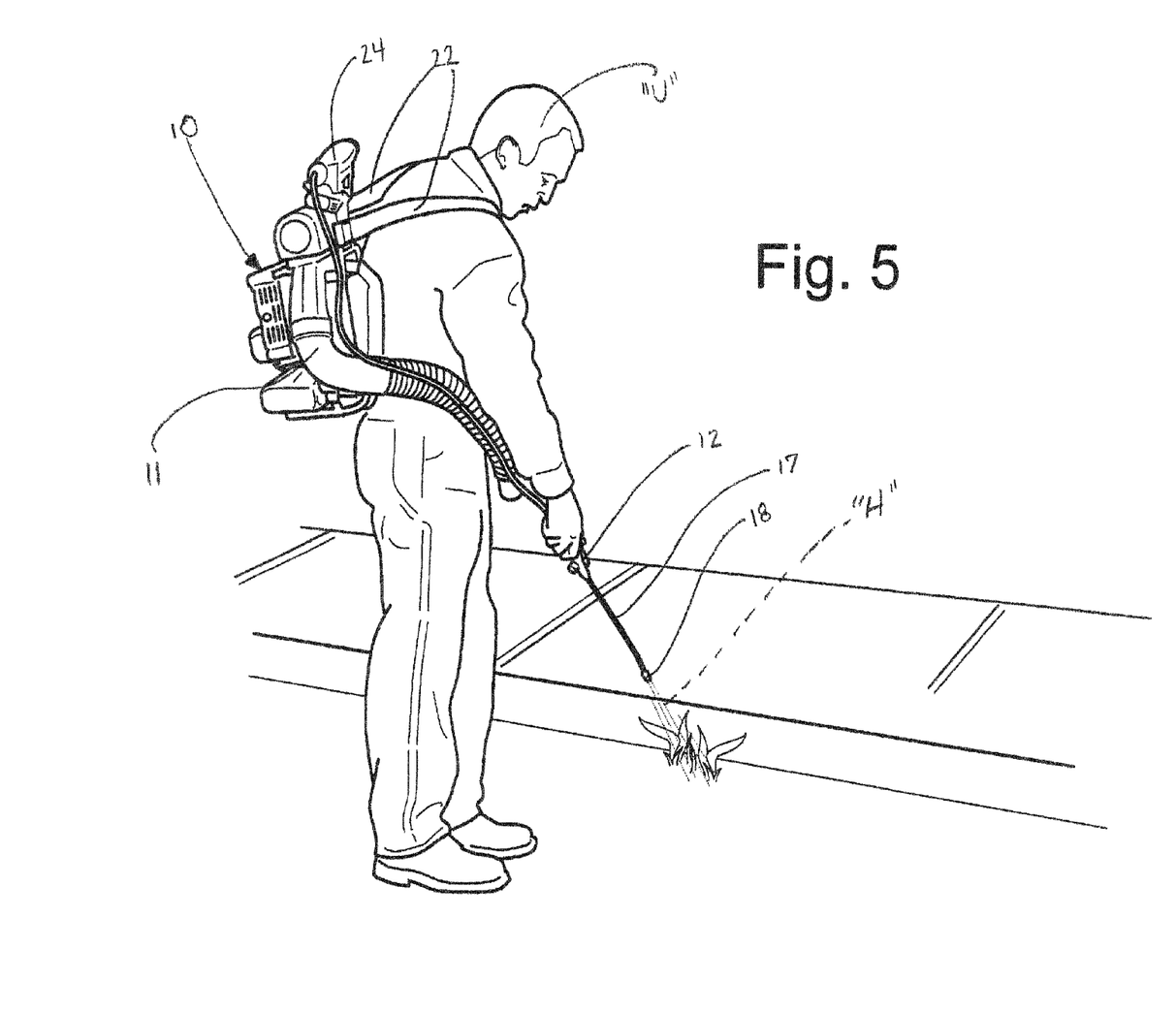
FIG. 5 is another environmental view showing the Combination Blower and Herbicide Spraying Device of FIG. 1 in use.

FIGS. 4 and 5 illustrate a preferred method of using the apparatus 10. When the invention is used to blow leaves, as illustrated in FIG. 4, the spray wand 17 is maintained in a carrying position in which the wand 17 is contained within the holder 19. When the user "U" desires to spray herbicide "H", the wand 17 is removed from the holder 19, as shown in FIG. 5. The user "U" points the wand 17 at the location at which he desires to spray herbicide, and then engages the trigger 14 to release herbicide "H" from the spray tip 18.

The removable spray wand 17 enables the user "U" to precisely spray the herbicide "H" at particular locations, without having to point and direct the entire apparatus 10. Furthermore, the ability to point the spray wand 17 away from the end of the blower 11 eliminates the risk of air from the blower 11 blowing herbicide into unwanted locations, such as desirable vegetation or the user "U" himself. This results in a safer and more ergonomic method over the prior art.

The invention substantially increases efficiency for landscaping operations by enabling the user "U" to blow leaves and grass clippings off sidewalks, curbs and parking lots, and spray herbicide with a single apparatus. As such, work time is substantially reduced as the user need not travel twice over the same landscaping route as in prior operations that require workers to blow leaves and grass clippings separately from spraying. The invention enables the user to accomplish in one trip what previously required two. Accordingly, the invention improves efficiency by reducing the amount of labor time required with prior art devices, and reducing the amount of wasted materials by providing precise, targeted spraying. Furthermore, the invention improves safety by minimizing the risk of the user's exposure to dangerous materials.

Figure 6:
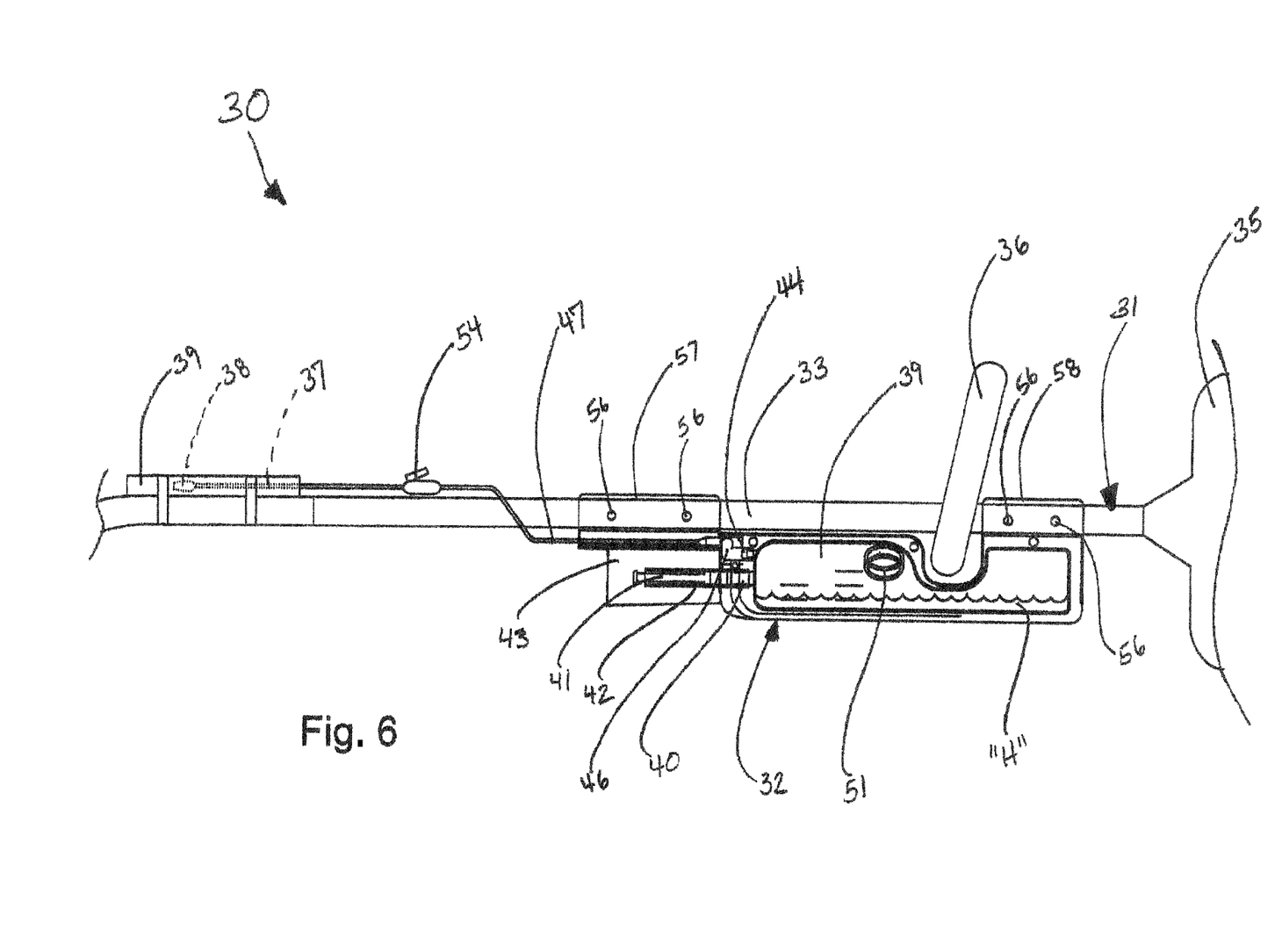
FIG. 6 is a partial side elevation of a Combination Blower and Herbicide Spraying Device, according to another preferred embodiment of the invention.
Figure 7:
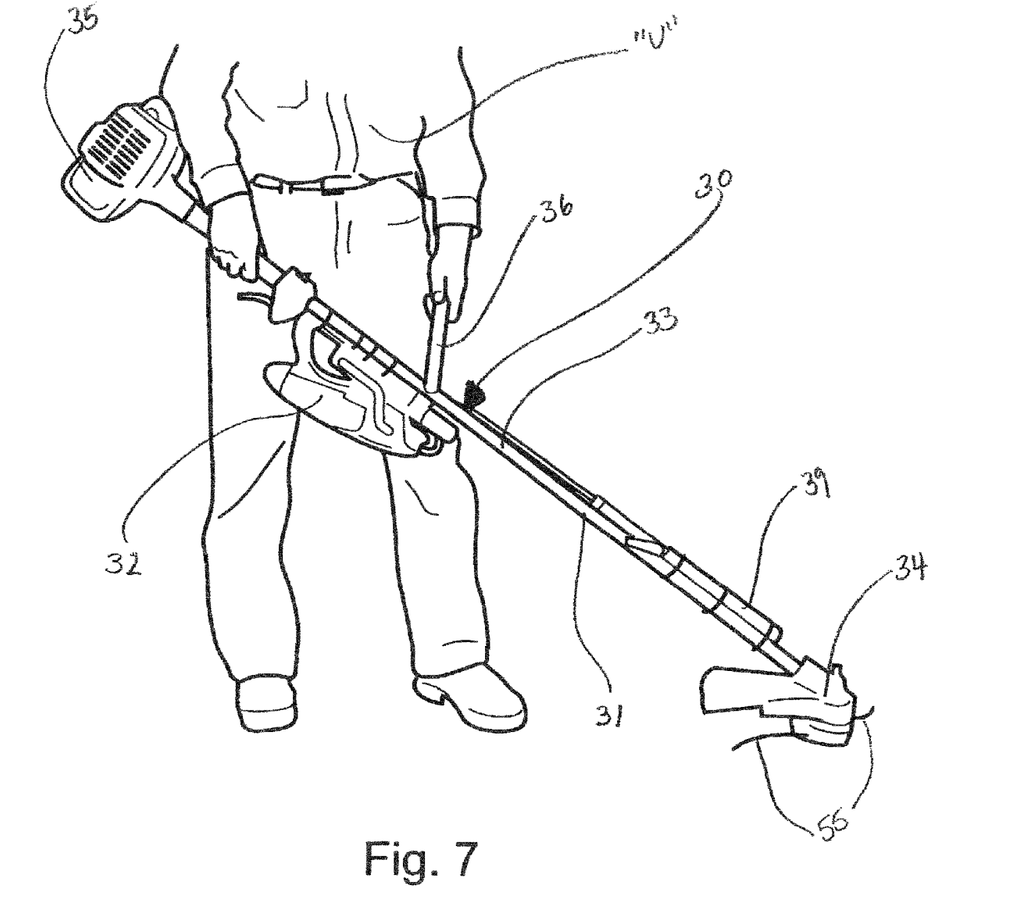
FIG. 7 is an environmental view showing the Combination Blower and Herbicide Spraying Device of FIG. 6 in use.
Figure 8:
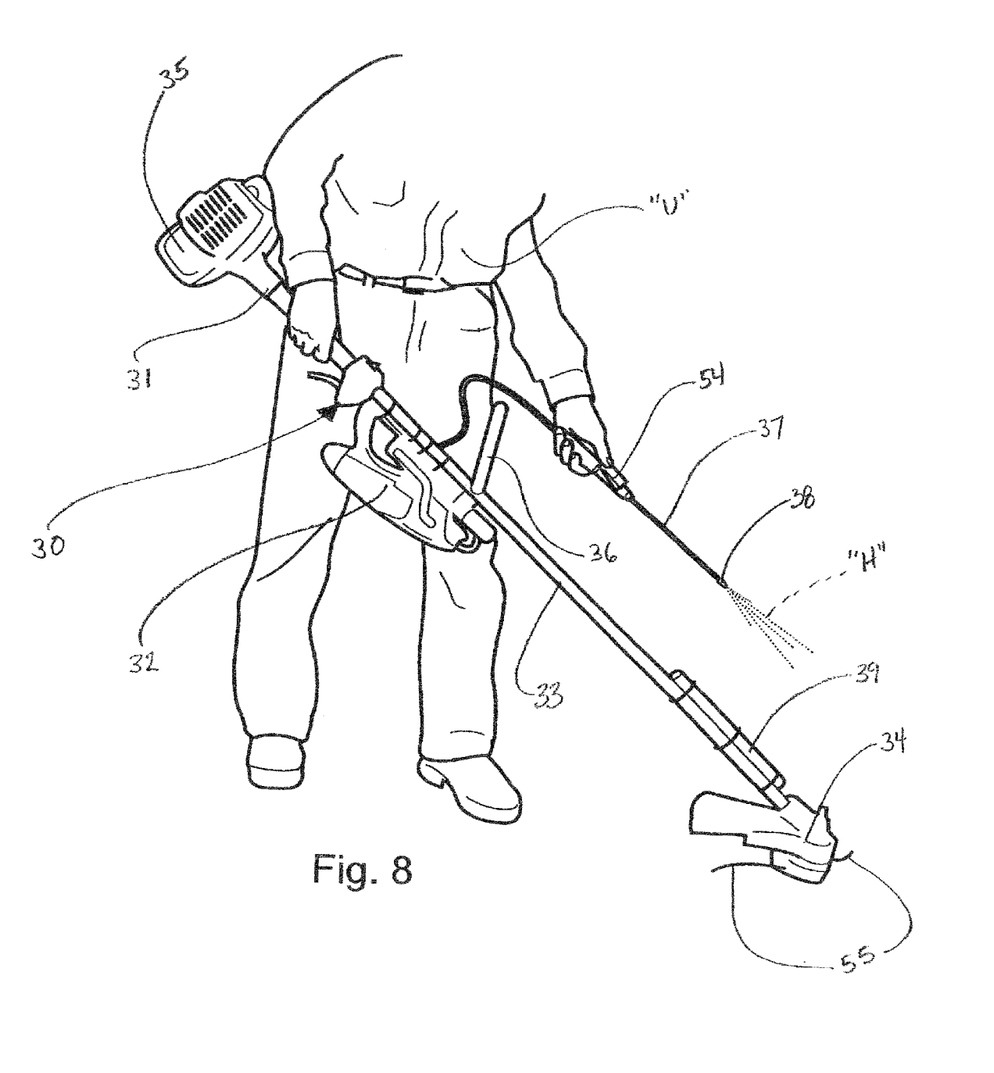
FIG. 8 is another environmental view showing the Combination Blower and Herbicide Spraying Device of FIG. 6 in use.

Another preferred embodiment of the invention is illustrated in FIGS. 6-8, and shown generally at reference numeral 30. The apparatus 30 generally comprises a grounds maintenance device such as a motorized weed trimmer 31, and a sprayer 32. The weed trimmer 31 includes an arm 33 with proximal and distal ends. A weed trimmer head piece 34 is mounted at the distal end of the arm 33, as shown in FIG. 7. The head piece 34 includes a rotatable string 55, preferably made of nylon, plastic or other suitable material, for cutting weeds and other unwanted vegetation. A motor 35 is mounted at the proximal end of the arm 33, and is operatively connected to the head piece 34 to drive the rotatable string 55. The motor 35 can be powered by gas, electricity or other suitable energy source. A handle 36 is mounted on the arm 33 proximate the proximal end.

The sprayer 32 is attached to the arm 33 via mounting supports 57, 58. Each mounting support 57, 58 defines apertures 56 for receiving a fastener, such as a screw, that engages the arm 33. The sprayer 32 comprises a container 39 for holding a desired fluid, such as a liquid herbicide "H". It should be noted that other liquid compositions having agricultural and/or botanical purposes, such as liquid fertilizers, can be stored in the container 39 and used in conjunction with the invention. As shown in FIG. 6, the container 39 includes an indenture to conform around the handle 36. Preferably, the container 39 is sized to hold approximately twenty fluid ounces.

The container 39 includes a first opening that communicates with an input port 40. A piston 41 is positioned within a pump tube 42 that communicates with the input port 40. A hand actuator 43 is positioned and operatively connected to the piston 41. By grasping and moving the actuator 43 back and forth the piston 41 is moved forcing air through the input port 40 and into the container 39 in order to pressurize the container 39.

As shown in FIG. 6, the container 39 includes a second opening positioned above the first opening. The second opening communicates with a discharge outlet 44. A pick-up hose 45 is positioned within the discharge outlet 44 for facilitating withdrawal of herbicide "H" from the container 39. A valve 46 is also positioned within the discharge outlet 44 for controlling the flow of liquid out of the discharge outlet 44. An elongate fluid line 47 is connected to the discharge outlet 44 at one end, and a spraying member, such as a spray wand 37, at the other end.

A trigger 54 is positioned at the junction of the fluid line 47 and the wand 37, and is operatively connected to the valve 46. Pressing the trigger 54 opens the valve 46 to allow the pressurized herbicide "H" within the container 39 to flow through the discharge outlet 44 and into the fluid line 47. The herbicide "H" flows through the fluid line 47, into the spray wand 37, and is dispensed out of the wand tip 38. By pressing the trigger 54, the desired amount of herbicide can be dispensed from the wand 37.

The length of the fluid line 47 is adjustable, and the fluid line 47 preferably extends a substantial length of the arm 33 to allow for the container 39 to be positioned proximate the handle 36 near the proximal end of the arm 33, and the tip 38 of the wand 37 to be positioned proximate the distal end of the arm 33, as shown in FIG. 6. By positioning the container 39 proximate the handle 36, the substantial weight of the liquid filled container 39 can be more easily borne by the user and greater control can be exercised over the apparatus 30.

The spray wand 37 can be contained within a holster-like apparatus, such as wand holder 39, as shown in FIG. 6. The spray wand 37 can be removed from the wand holder 39, as shown in FIG. 8, and moved independently of the weed trimmer 31 in any direction.

The container 39 has a third opening that is covered by a fill cap 51. The fill cap 51 is held on the container 39 by threaded engagement or other appropriate means. To fill the container 39 with the desired liquid, the fill cap 51 is removed and the liquid is poured through the third opening.

As shown in FIGS. 7 and 8, the apparatus 30 is operable in two modes—a weed trimming mode and a liquid dispensing mode. When operated in the weed trimming mode, shown in FIG. 7, the user "U" operates the weed trimmer 31 to cut weeds and other vegetation as desired, and the spray wand 37 is maintained within the holder 39. When the user "U" desires to dispense a liquid, such as a pesticide, herbicide, fungicide, insecticide or fertilizer, the wand 37 is removed from the holder 39, and the user "U" points the wand 37 at the location at which he desires to spray herbicide "H", and then engages the trigger 54 to release herbicide "H" from the spray tip 38.

Figure 9:
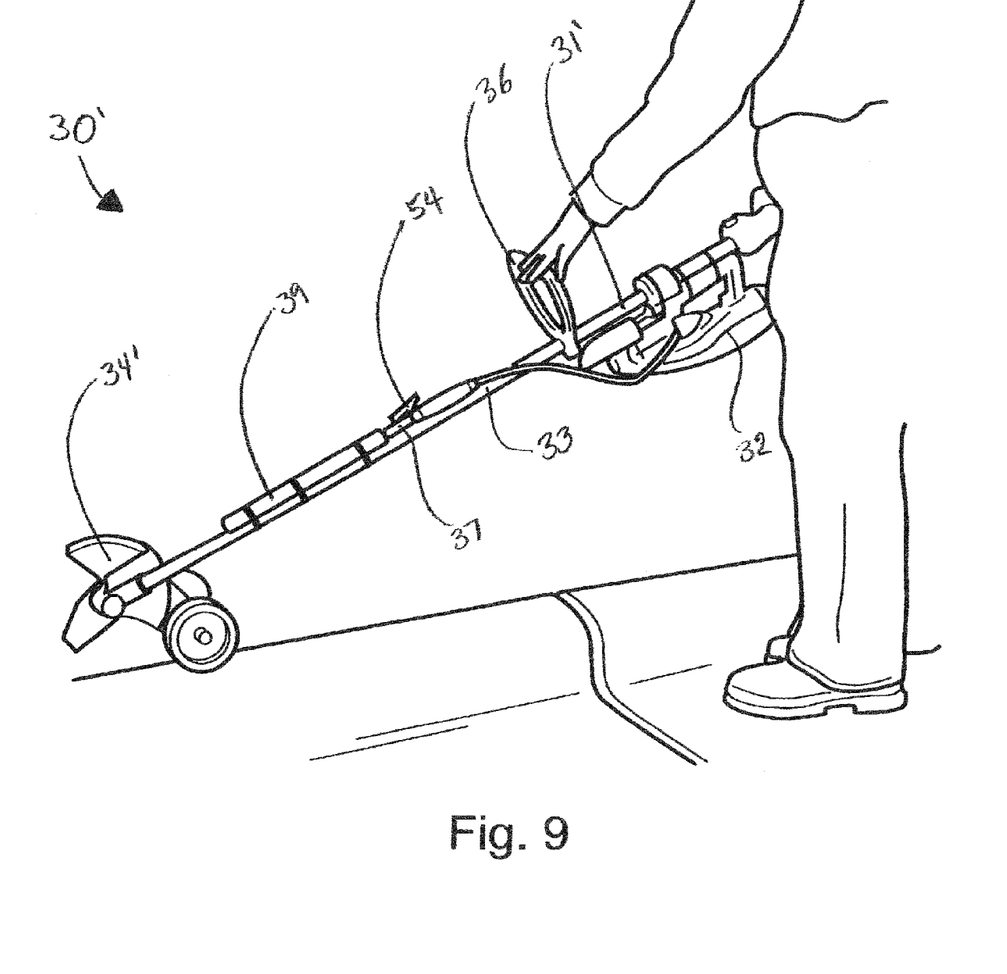
FIG. 9 is an environmental view of a Combination Blower and Herbicide Spraying Device, according to another preferred embodiment of the invention.
Figure 10:
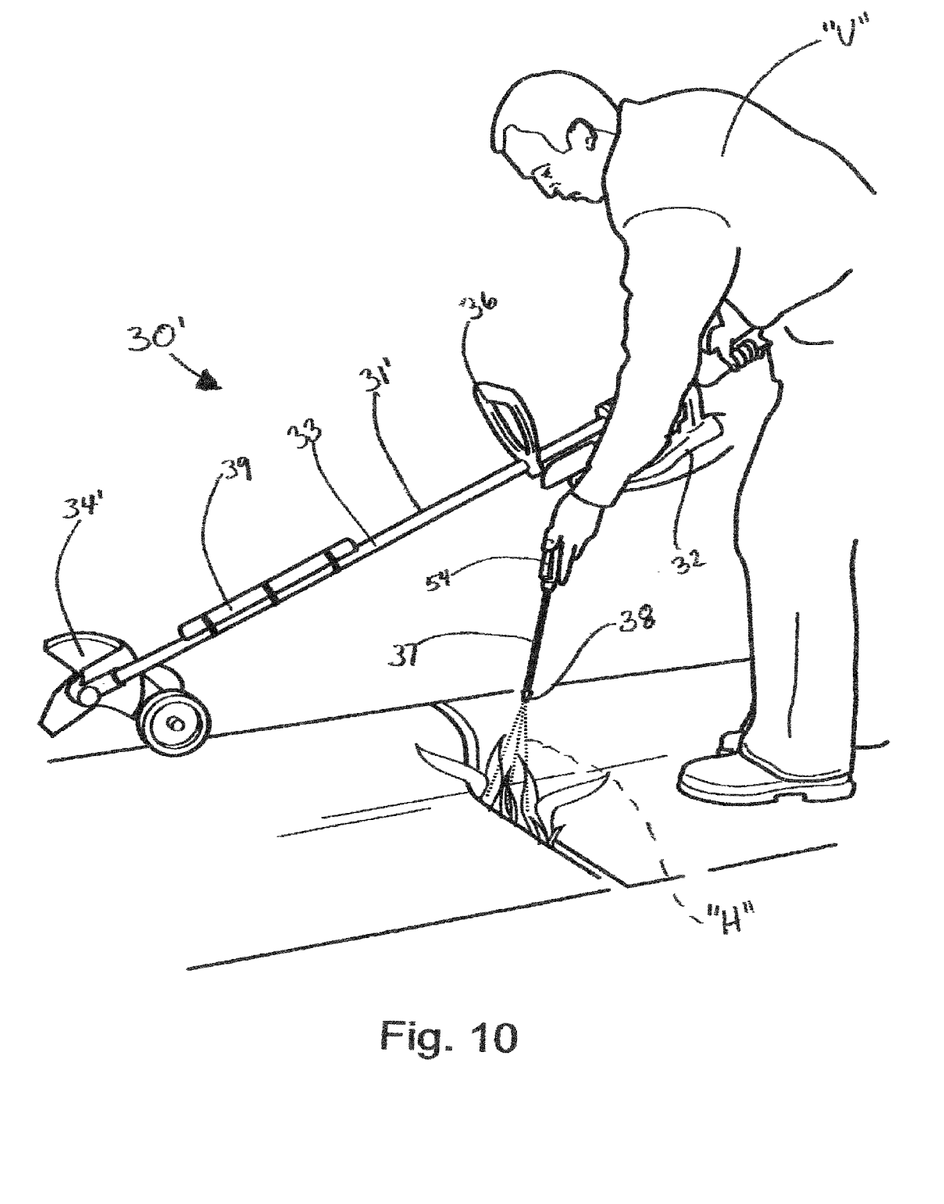
FIG. 10 is another environmental view showing the Combination Blower and Herbicide Spraying Device of FIG. 9 in use.

Yet another preferred embodiment of the invention is illustrated in FIGS. 9 and 10, and shown generally at reference numeral 30'. The apparatus 30' is the same in all significant aspects as the previously described embodiment, apparatus 30, except that apparatus 30' is adapted for use with an edger 31', instead of the previously disclosed weed trimmer 31. Accordingly, the same reference numerals have been retained to denote those features that are the same in both apparatus 30 and apparatus 30'. The apparatus 30' includes a head piece 34' comprising an edging device. The edging device 34' is driven by the motor 35. The apparatus 30' is operated in a similar manner as the previously described apparatus 30.

It should be noted that the invention can be used with grounds maintenance devices other than those recited in the above described embodiments. As used in this application, "grounds maintenance device" refers generally to any tool, machine, implement, etc. that can be used in the maintenance, cleaning and/or landscaping of any natural or unnatural area, such as lawns, curbs, walkways, driveways and/or parking lots.

A Combination Blower and Herbicide Spraying Device is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

What is claimed is:

1. A grounds maintenance apparatus comprising:
    (a) a grounds maintenance device comprising a motorized leaf blower unit adapted for being carried by a user, the motorized leaf blower comprising a motor carried on the back of a user using a strap;
    (b) a spraying device for spraying a fluid comprising a container for holding the fluid, and an independently moveable spraying member in communication with the container for spraying the fluid; and
    (c) a receiving member attached to the grounds maintenance device for receiving and removably carrying the spraying member on the ground maintenance device, whereby the spraying member is moveable between a carrying position wherein the spraying member is carried by the receiving member and a spraying position wherein the spraying member is removed from the receiving member and moveable independent of the grounds maintenance device, and further wherein the spraying member is easily moveable between the carrying position and the spraying position without removing the receiving member from the ground maintenance device;
    (d) an air pump in communication with the container via a first fluid line, whereby the container is pressurized;
    (e) a second fluid line connecting the container and the spraying member; and
    (f) a trigger operatively connected to a valve positioned in the second fluid line whereby pressing the trigger opens the valve to allow the fluid to pass through the second fluid line and into the spraying member.

2. An apparatus according to claim 1, wherein the container is sized to hold approximately forty fluid ounces.

3. An apparatus according to claim 1, wherein the fluid comprises one or more selected from the group consisting of a herbicide, fungicide, pesticide and insecticide.

4. An apparatus according to claim 1, wherein the spraying member comprises a wand, and further wherein the receiving member comprises an elongate holder mounted on the grounds maintenance device comprising an enclosure shaped and sized to receive the wand, an open longitudinal end for inserting the wand therethrough and a closed longitudinal end, wherein at least a part of the wand is positioned within the holder and the closed longitudinal end covers a terminal end of the wand when in the carrying position.

5. An apparatus according to claim 4, wherein the wand and the holder are substantially cylindrical, and the holder has a diameter slightly larger than the wand.

6. An apparatus according to claim 4, further comprising at least one strap positioned around the holder and the grounds maintenance device for attaching the holder to the grounds maintenance device.

7. A grounds maintenance apparatus comprising:
   (a) a motorized leaf blower unit adapted for being carried by a user having an elongate tube for dispensing a stream of air; and
   (b) a spraying device for spraying a fluid comprising:
      (i) a container for holding the fluid, and
      (ii) a wand in communication with the container for spraying the fluid, the wand moveable from a carrying position wherein the wand is carried on the elongated tube, and a spraying position wherein the wand is moveable independent of the elongated tube; and
   (c) a holster attached to the leaf blower unit for receiving and removably carrying the wand when in the carrying position, the holster comprising an enclosure shaped and sized to receive the wand, an open longitudinal end for inserting the wand therethrough and a closed longitudinal end covering a terminal end of the wand when in the carrying position;
   (d) an air pump in communication with the container via a first fluid line, whereby the container is pressurized;
   (e) a second fluid line connecting the container and the spraying member; and
   (f) a trigger operatively connected to a valve positioned in the second fluid line whereby pressing the trigger opens the valve to allow the fluid to pass through the second fluid line and into the spraying member.

8. An apparatus according to claim 7, wherein the leaf blower unit includes a motor for being carried on a back of a user.

9. An apparatus according to claim 7, wherein the container is mounted on the leaf blower unit.

10. An apparatus according to claim 7, wherein the wand and the holster are substantially cylindrical, and the holster has a slightly larger diameter than the wand.

11. A grounds maintenance apparatus comprising:
   (a) a motorized leaf blower unit adapted for being carried by a user, and having an elongate tube for dispensing a stream of air;
   (b) a pressurized container proximate the grounds maintenance device for holding the fluid;
   (c) a first fluid line in communication with the container;
   (d) an elongate spraying wand having a first end connected to the fluid line and a second end for dispensing fluid therefrom, the spraying wand moveable from a carrying position wherein the spraying wand is carried on the elongate tube unit to a spraying position wherein the spraying wand is moveable independent of the elongate tube unit; and
   (e) wherein the fluid line is flexible in relation to the spraying wand to allow for free movement of the spraying wand when in the spraying position, and the spraying wand is rigid in relation to the fluid line and adapted for being held in a hand of a user when in the spraying position;
   (f) a second fluid line connecting the container and the spraying member; and
   (g) a trigger operatively connected to a valve positioned in the second fluid line whereby pressing the trigger opens the valve to allow the fluid to pass through the second fluid line and into the spraying member.

12. An apparatus according to claim 11, further comprising a receiving member mounted on the leaf blower unit comprising an enclosure shaped and sized to substantially cover and carry the spraying member when in the carrying position and an opening for receiving the spraying member therethrough, wherein the receiving member covers the second end of the spraying member when in the carrying position.

13. An apparatus according to claim 11, wherein the container is sized to hold approximately forty fluid ounces.

14. An apparatus according to claim 11, further comprising an air pump in communication with the container for pressurizing the container.

\* \* \* \* \*